United States Patent [19]

Thornley

[11] Patent Number: 4,791,245

[45] Date of Patent: Dec. 13, 1988

[54] TERMINATED ELECTRIC CABLE

[75] Inventor: David W. M. Thornley, Malmesbury, England

[73] Assignee: Raychem Limited, London, England

[21] Appl. No.: 170,575

[22] Filed: Mar. 10, 1988

Related U.S. Application Data

[63] Continuation of Ser. No. 070,859, Jul. 8, 1987, abandoned.

[30] Foreign Application Priority Data

Jul. 15, 1986 [GB] United Kingdom ............... 8617141

[51] Int. Cl.$^4$ .................. H02G 15/02; H02G 15/068
[52] U.S. Cl. ................... 174/73.1; 174/74 R; 174/80; 307/9
[58] Field of Search ............ 174/73 R, 73 SC, 74 R, 174/75 R, 75 D, 80; 213/1.3; 280/422; 307/9

[56] References Cited

FOREIGN PATENT DOCUMENTS

| 920247 | 3/1963 | United Kingdom | 174/80 |
| 1266195 | 3/1972 | United Kingdom | 174/7.3 R |
| 1280172 | 7/1972 | United Kingdom | 174/DIG. 8 |
| 1526397 | 9/1978 | United Kingdom | 174/73 R |
| 2135138 | 8/1984 | United Kingdom | 174/73 R |
| 2132941 | 7/1986 | United Kingdom | 174/92 |

Primary Examiner—Laramie E. Askin
Attorney, Agent, or Firm—Edith A. Rice; Herbert G. Burkard

[57] ABSTRACT

The termination of a high voltage electric cable includes a rigid heat shrinkable tube that extends between the cable jacket and a connector mounted on the cable conductor. The tube is made from an engineering plastic material and has a Flexural Modulus and a Young's Modulus high enough so as to ensure that the termination is self supporting. The termination may be used in the transmission of power from one carriage to another of an electric train.

11 Claims, 3 Drawing Sheets

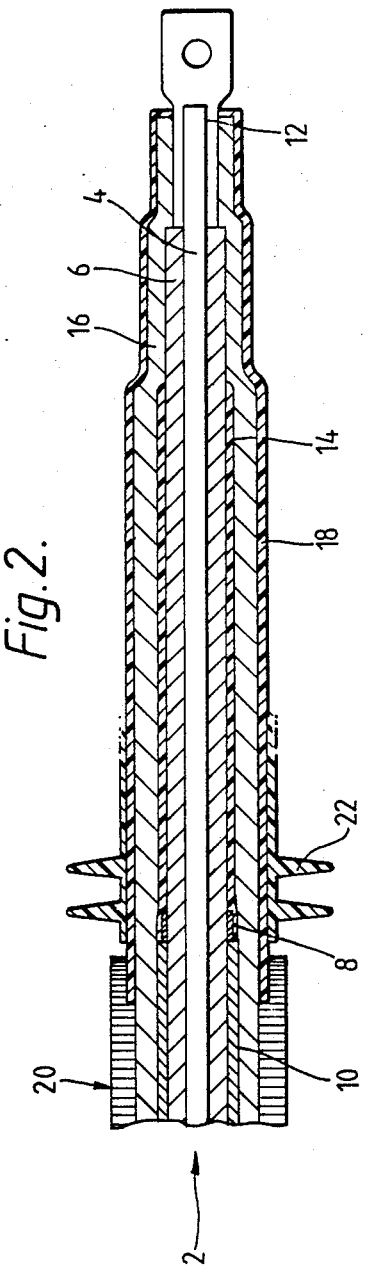

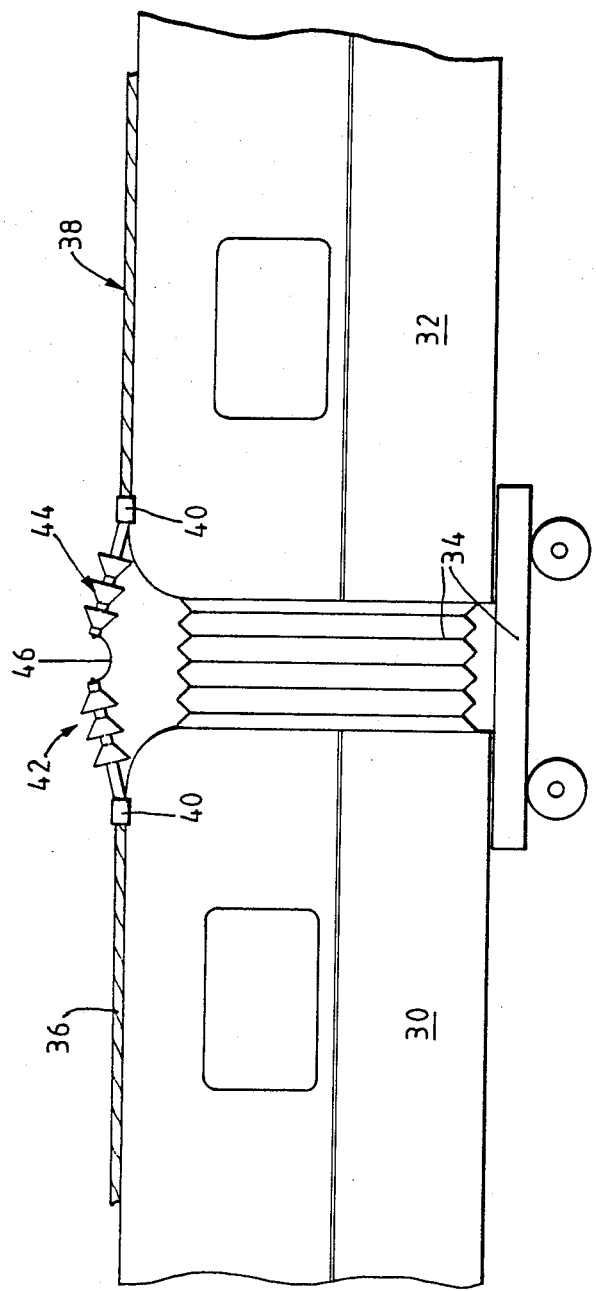

TERMINATED ELECTRIC CABLE

This application is a continuation of application Ser. No. 070,859, filed July 8, 1987, now abandoned.

DESCRIPTION

This invention relates to a terminated electric cable, and is concerned particularly, though not exclusively, with cables rated at about 1 kV and above (high voltage) suitable for the transmission and distribution of electric power.

High voltage power cables may be terminated by several methods. One versatile and popular method uses heat recoverable components. Raychem has sold heat recoverable cable termination kits for many years, and these comprise a connecting lug that is crimped or otherwise secured to the conductor, and heat shrinkable polymeric tubing that is recovered onto the cut back cable end to provide electrical insulation and, where necessary, weather-resistance and non-tracking properties. Additionally, at voltages above about 15 kV a tubing of stress grading material is applied so as to reduce the electrical stress at the termination. For outdoor or otherwise polluted environments, it is customary to provide the outermost tubing with one or more sheds to increase the current leakage path and to divert water and other liquids from the termination. Such polymeric terminations have the advantages that they are of light weight, are quick and easy to install, can be used with paper-insulated cable as well as plastic-insulated cable, and, because of their range-taking ability, reduce inventory since one kit may be used for the termination of a range of cable sizes.

Another polymeric cable termination involves the use of a tubing that is slightly stretchable and that is applied by being pushed onto the prepared end of a cable. Whilst being of lightweight, such a termination does not have the range-taking ability of a heat-shrinkable system, and furthermore, is suitable mainly for plastic-insulated cable.

These known polymeric terminations, however, are not designed to take high mechanical bending loads, but are arranged to have their weight supported by the bolting of the connecting lug to electrical equipment, such as a transformer or switchgear, or to a stand-off insulator mounted on a cable supporting post.

There are applications, however, where a self-supporting yet lightweight termination is required. One such application is the distribution of electric power from one carriage to another of a multi-carriage electrically-powdered vehicle such as a train.

Lightweight but rigid, and thus self-supporting, terminations can be provided by placing a completed polymeric termination in a glass-fibre reinforced plastic tube and filling the resulting annular region with a curable epoxy filler. However, under test and operating conditions, when such a termination is subject to load, and thus thermal, cycling, there is a tendency for the cured resin to crack since the coefficients of thermal expansion of the polymeric and resin materials can differ by as much as a factor of ten. Electrical discharges can occur in the voids formed by the cracking, and can seriously curtail the lifetime of the termination.

Another type of rigid termination is provided by using as an outer component a tube of porcelain. However, a potting compound still has to be employed with the attendant thermal problems, and furthermore, the weight of the termination is quite high.

It is an object of the present invention to provide a cable termination that combines lightness with rigidity.

Accordingly, the present invention provides a lightweight terminated electric cable that is sufficiently rigid that it is self-supporting over the length of the termination.

In accordance with one aspect of the present invention, there is provided a self-supporting terminated electric cable, wherein at the terminated end, the outer jacket of the cable has been removed to expose the cable dielectric, the dielectric has been removed to expose the cable conductor, and a connector has been secured to the exposed conductor, and wherein an arrangement comprising a first tubular member that is recoverable and electrically insulating and that has a flexural modulus of at least 500 MPa over the temperature range $-55°$ C. to $+80°$ C. is mounted on the cable end such that the recovered tubular member has a wall thickness of at least 1 mm and encloses the exposed cable dielectric and overlaps the cable outer jacket and the connector.

The tubular member may have a flexural modulus of about 1500 MPa, or even higher, over at least part of the given temperature range, the modulus being measured in accordance with ASTM D 638-72.

In accordance with another aspect of the present invention, there is provided a terminated electric cable, wherein at the terminated end, the outer jacket of the cable has been removed to expose the cable dielectric, the dielectric has been removed to expose the cable conductor, and a connector has been secured to the exposed conductor, and wherein an arrangement comprising a first tubular member that is recoverable and electrically insulating, and that has a Young's Modulus of at least 5000 Kgm/cm$^2$ over the temperature range $-55°$ C. to $+80°$ C., is mounted on the cable end such that the recovered tubular member has a wall thickness of at least 1 mm and encloses the exposed cable dielectric and overlaps the cable outer jacket and the connector.

The tubular member may have a Young's Modulus of about 15000 Kgm/cm$^2$, or even higher, over at least part of the given temperature range, the modulus being measured in accordance with ASTM D 790-71.

It is known that the moduli given are temperature dependent, and for some materials, the modulus decreases rapidly as the temperature is increased, for example by up to 50% over the temperature range $+20°$ C. to $+80°$ C. The temperature range of $-55°$ C. to $+80°$ C. is important since it is the normal operating range of an electric cable termination, and is thus the range over which the termination is required to remain rigid and to be self-supporting.

After the cable has been prepared for termination, that is to say after the cable jacket and cable dielectric (and cable screen where necessary) have been cut back, a connector of suitable form is secured to the cable so as to provide electrical continuity between the conductor of the cable and whatever other electrical equipment (which may be another conductor) it is to be connected to. The connector may be crimped onto the cable conductor and/or may be secured thereto in another suitable manner. The connector may be a simple connecting lug, or it may be of more complex configuration.

In general, materials known as engineering plastic materials are suitable for forming the first tubular member.

A tubular member, which may be used in the present invention, having the given minimum value of flexural and/or Young's modulus will be self-supporting, and will also provide a cable termination that is self-supporting with known cable constructions and sizes.

The length of the overlap of the first tubular member and the outer jacket of the cable is preferably at least twice the diameter of the cable jacket. The length of the overlap of the first tubular member and the connecting lug is preferably at least 50 mm. The length of the exposed cable dielectric, which is covered by the first tubular member, is preferably at least 500 mm.

Thus, the terminated cable of the invention is particularly useful where the terminated end is required to extend away from a support member, since separate means of support, such as heavy and mechanically vulnerable porcelain members, are not required. One such application is to convey electrical power between two bodies, such as train carriages, that are attached to each other in a manner that allows a limited amount of relative movement therebetween. The cables on adjacent carriages may each be terminated in accordance with the present invention and mounted so as to be cantilevered towards each other, electrical interconnection being made by a flexible conductor. Another such application is in the take-off of a power conductor from an overhead power line. Conventionally, a support post carries a cable up from ground level, this cable is terminated and mounted spaced apart from the post by relatively heavy stand-off insulators, and the cable is then connected to the overhead conductor. Utilisation of the present invention allows the stand-off insulator to be dispensed with. In each of these applications, the weight of the termination, and its vulnerability to mechanical damage, is reduced by employing the present invention.

A recoverable article is an article the dimensional configuration of which may be made to change appreciably when subjected to the appropriate treatment. The article may be heat-recoverable such that the dimensional configuration may be made to change when subjected to a heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be transient form in a continuous process in which, for example, an extruded tube is expanded, whilst hot, to a dimensionally heat-unstable form but, in other applications, a preformed dimensionally heat-stable article is deformed to a dimensionally heat unstable form in a separate stage.

The polymeric material may be crosslinked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Patent No. 1,440,524, an elastomeric member such as an outer tubular member is held in a stretched state by a second member, such as an inner tubular member, which, upon heating weakens and thus allows the elastomeric member to recover.

The first tubular member, when not inherently having sufficiently good electrical and/or weathering characteristics, may be enclosed by a second recoverable member arranged to provide a protective outer surface for the termination. To this end, the second recoverable member may be electrically insulating, and/or non-tracking, and/or weather resistant, and may be provided by tubing sold by Raychem under the trade name HVTM. Furthermore, the second tubular member may have a shedded outer surface, that is to say, may be provided with projections that extend laterally of the cable axis in such a way as to shed water or other liquid contamination from the termination. The sheds may be discrete components mounted on to the second tubular member, or they may be formal integrally therewith.

However, it is envisaged that the mechanical properties of rigidity associated with the first tubular member, and the electrical and weather-resistance properties associated with the second tubular member, may be provided by a single material that may thus be formed into a tube and fulfill the functions of both the first and second tubular members. Furthermore, the sheds may be mounted on or provided integrally with such a composite tube. For example, the rigid first tubular member of the cable termination of the invention may be formed from a recoverable, for example radially shrinkable, fabric that is integral, for example impregnated with, a material that has good electrical insulating, non-tracking, and weather-resistance properties. The fabric tube is preferably woven, and preferably comprises shrinkable fibres of a polymeric material, such as high density polyethylene or KYNAR, arranged to provide circumferential recovery on heating, and high tensile strength fibres, preferably multi-filament glass fibres, extending in the longitudinal direction. The glass, or other longitudinal, fibres are advantageously coated with a polymer such as to prevent, in use, water or other moisture from wicking along the fabric tube. An outer polymeric jacket is then extruded on to, and thus impregnates, the fabric tube, the jacket being of a good electrical insulating, non-tracking and weather-resistant material. The polymer coating of the glass fibres is advantageously chosen so as to enhance bonding with the jacket material. The resulting tube is then irradiated to induce its recoverability.

The fabric tubular member may generally be as disclosed in EP-A-0116393, and the impregnating material may be as disclosed in UK Patent No. 1337951.

The tensile strength of such a fabric tubular product is determined not only by the particular material chosen for the longitudinal fibres, but also by the number of such fibres. For example, a tube having an internal diameter of 29 mm and containing 50 glass fibres around its circumference would have a tensile strength of about 5000 N.

Since such a tube is anisotropic, the values given above for Young's Modulus and the flexural modulus are applicable in the longitudinal direction.

In the case where the first recoverable member is not weather resistant, or is not completely covered by a weather resistant component, a recoverable tubular member may advantageously be recovered over the first tubular member at the overlap of the first tubular member with the jacket of the cable. A clamping means may then conveniently be clamped around this tubular member so as to secure the terminated end of the cable to a support member. The rigidity of the first tubular member is such that a typical length, of say up to one meter, of the terminated cable will be self-supporting beyond the clamping means and may thus extend at an angle upwardly away from the support member. This tubular member may be of an engineering plastic material, and may have a flexural modulus and/or a Young's modulus as given above for the first tubular member.

By non-tracking is meant a material that passes the ASTM D 2303 Inclined Plane tracking and erosion test. By "weather-resistant" is meant a material having properties that are at least as good as those set out in the Raychem Brochure "HVTM heat-shrinkable non-tracking tubing" EPP0068 2/86.

By using polymeric components, and particularly with plastic-insulated cable, the coefficients, of thermal expansion will not differ from each other by more than a factor of about 2, thus significantly reducing the likelihood of voids occurring in the termination due to thermal cycling. In this respect, it is to be noted that porcelain has a coefficient of thermal expansion that differs by a factor of 10 from such coefficients of polymeric materials.

At voltages above about 15 kV, it is usually necessary to provide means for controlling the electrical stress at the cut back end of a cable, and, in accordance with the invention, an arrangement for doing this is provided, and, preferably is located within said rigidifying arrangement of the terminated cable of the invention. Advantageously, the stress control may be provided by at least one recoverable tubular member of stress grading material, such as that sold by Raychem under the trade name SCTM. At such voltage levels, the cable will be electrically screened, that is to say, it will have an electrically conducting layer extending therealong between the cable dielectric and the outer jacket of the cable. The stress control tubing is arranged to overlap the cable screen, which is exposed at the termination for this purpose, and to extend along the dielectric of the cable towards the connector.

In accordance with a further aspect of the invention, there is provided a method of assembling a terminated cable as herein disclosed.

Some embodiments of a terminated cable in accordance with the present invention, its method of assembly, and its application, will now be described, by way of example, with reference to the accompanying drawings, in which:

FIG. 2 is a sectional elevantion of another embodiment of the cable; and

FIG. 3 is a schematic representation of one application of the cable of FIG. 1 or 2.

Figure 1:
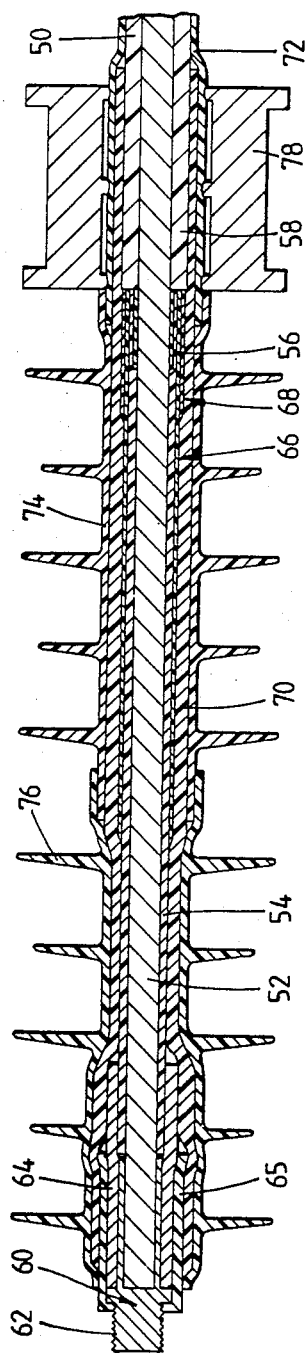
FIG. 1 is a sectional elevation of one embodiment of the cable.

Referring to FIG. 1, a 25 kV single core, screened, plastic insulated cable 50 comprises a central copper conductor 52, overlying cross-linked polyethylene insulation 54, an earthed conductive screen 56, and a PVC outer jacket 58. The cable 50 is cut back in known manner to expose each of the above-mentioned components so that the cable may be terminated.

A tinned copper connector 60 is crimped onto the exposed end of the conductor 52 and an externally-threaded connecting portion 62 projects therefrom. A heat shrinkable tubular sleeve 64 having an internal adhesive coating is recovered over the crimped portion of the connector 60 and over an adjacent portion of the cable dielectric 54, to seal the connector 60 against the ingress of moisture. Retention and rigid attachment of the crimp connector 60 to the cable 50 is enhanced by a tinned copper cylinder 65 that is threaded onto the connecting portion 62 and overlies the sealing sleeve 64.

Towards the other end of the cable 50, a first heat shrinkable tubing 66 of electrical stress grading material, an SCTM tubing from Raychem, is recovered so as to extend from the cut back of the cable jacket 58, over the exposed cable screen 56 and along approximately two thirds of the length of the exposed cable dielectric 54. A second but shorter SCTM tubing 68 is recovered on top of the first stress grading tubing 66 at the cable jacket end, overlying the cable screen 56.

A heat shrinkable rigid tube 70 of engineering plastic material is recovered over the partially-terminated cable 50, and extends so as at one end to overlap the cable jacket 58 and at the other end to overlap the copper retaining cylinder 65. The tube 70 has a flexural modulus of 1500 MPa (when measured in accordance with ASTM D 638-72), and a Young's Modulus of 15000 Kgm/cm$^2$ (when measured in accordance with ASTM D 790-71), the moduli values being measured at an ambient temperature of 20° C.

A weather-resistant protective heat shrinkable engineering plastic tube 72 is recovered over the end of the rigid tube 70 where it overlies the cable jacket 58 and along the tube 70 to encompass its overlap of the cable jacket. A first heat shrinkable moulded polymeric component 74 of generally tubular configuration and having a shedded outer surface is recovered on to the rigid tube 70 with at one end an overlap onto the protective tube 72. A second similar component 76 overlaps the other end of the first component 74 and extends beyond the tube 70 at the connector end of the cable 50. The components 74 and 76 are made of an electrically insulating, non-tracking and weather resistant material, such as used by Raychem in its HVTM tubing. Thus, the vulnerable outer surface of the rigid tube 70 is fully encased in protective material to give the terminated cable good electrical and weather-resistant properties. It will be appreciated also that the sheds of the components 74 and 76 serve not only to direct water away from the core of the terminated cable, but also to increase the creapage current path length therealong.

The rigidity of the tube 70 ensures that the terminated cable is self-supporting. An aluminum end fitting 78, consisting of two half shells, is clamped around the end of the terminated cable in the region of the engineering plastic protective tube 72 and is arranged, in use, (not shown) to be secured within a complementarily-shaped metal fitting, which is usually maintained at earth potential, and which is mounted on a support structure, for example as described below with reference to FIG. 3.

Referring to FIG. 2, a 25 kV single core, screened, plastic-insulated power cable 2 comprises a central copper conductor 4, and overlying cross-linked polyethylene insulation 6, earthed conductive screen 8 and PVC outer jacket 10. The cable 2 is cut back in known manner to expose each of the above-mentioned components such that the cable may be terminated. The cable 2 is terminated in a manner different from that of the cable of FIG. 1.

A copper connecting lug 12 is crimped onto the exposed end of the conductor 2, and Raychem heat shrinkable stress control SCTM tubing 14 is recovered onto the cable 2 such that it overlaps the exposed end of the cable screen 8 and extends therefrom along the insulation 6 towards the lug 12.

A tube 16 of heat recoverable crosslinked engineering plastic material is recovered on to the cable 2 such that it encloses the entire length of the stress control tubing 14 and exposed insulation 6, and extends at one end back along the cable jacket 10, and at its other end extends along the exposed connecting lug 12. The tube 16 has a flexural modulus of 1500 MPa when measured in accordance with ASTM D 638-72, and a Young's Modulus of 15000 Kgm/cm$^2$ when measured in accordance with ASTM D 790-71.

An insulating, weather resistant and non-tracking, heat-recoverable tube 18, sold by Raychem under the trade name HVTM, is recovered onto the cable 2 so as to enclose the engineering plastic tube 16 at the lug end of the cable, and to extend back along the cable over the major portion of the tube 16. A weather-resistant, heat recoverable engineering plastic tube 20 is recovered over the remaining portion of the tube 16 where it overlaps the cable jacket 10, and also sealingly overlaps the adjacent end of the HVTM tube 18. Thus, the entire length of the rigid tubing 16, which may itself not be weather-resistant or nontracking, is covered by suitable protective material. Finally, the creepage path length of the terminated cable is increased by the provision of a plurality of sheds 22 mounted, by heat recovery, on and along the outer surface of the HVTM tube 18. Although only a few sheds are shown, it is envisaged that they will extend all along the outer surface of the HVTM tubing 18.

The tube 16 has an outer diameter of 40 mm and a wall thickness of 4 mm, after free recovery (and thus before expansion), and a total length of 650 mm. The overlap of the tube 16 with the lug 12 is 50 mm, and the overlap with the cable jacket 10 is 100 mm.

The protective tube 20 is of a length at least to cover and exposed length of the rigid tube 16, but also of sufficient length to receive therearound a clamp (not shown) for securing the cable to a support member (not shown).

Referring to FIG. 3, an electric train has two carriages 30,32, that are interconnected in conventional manner by an articulated arrangement 34 that allows some relative movement between the carriages. A 25 kV cable 36 that transmits drive power to the train is secured along the roof of carriage 30 and is connected to a similar cable 38 on the roof of the carriage 32. To effect the connection, each cable 36,38 is terminated at the opposing ends of the carriages 30,32 in the manner described with respect to the cable 50 of FIG. 1 or cable 2 of FIG. 2. Clamps 40 secure the cables 36,38 at their respective rigid terminated ends 42,44 to the respective carriages at a separation of 1300 mm. The clamps 40 are arranged so that the cable ends 42,44 extend self-supportingly upwardly away from the carriages towards each other so that the cable connecting lugs (not shown) are disposed adjacent each other. A flexible conductive braid 46 has a connecting lug (not shown) at each end and these lugs are bolted to respective ones of the connecting lugs of the terminated ends 42,44 of the cables 36,38 so as thereby to provide electrical continuity between the cable conductors. The braid 46 is enclosed within a weather-resistant covering.

In this way, distribution of electrical power between the carriages of the train can be achieved in a simple and effective manner, using lightweight components.

It will be understood that advantageously the first tubular member of the invention satisfies both the flexural modulus and the Young's Modulus requirement set out herein.

I claim:

1. A self-supporting terminated cable, said cable comprising a conductor, a dielectric and an outer jacket, wherein at an end of said cable to be terminated, said outer jacket of the cable has been removed to expose said delectric, the dielectric has been removed to expose said conductor, and connector means has been secured to the exposed conductor, and wherein an arrangement comprising a first tubular member that is recoverable and electrically insulating and that has a flexural modulus of at least 500 MPa over the temperature range −55° C. to +80° C. is disposed on said cable end such that said tubular member has a wall thickness of at least 1 mm and encloses said exposed cable dielectric and overlaps said cable outer jacket and said connector.

2. A terminated electric cable according to claim 1, wherein said arrangement comprises at least one second tubular member that is recoverable, weather-resistant and non-tracking, and that has been recovered over said first tubular member.

3. A terminated electric cable according to claim 2, wherein said at least one second tubular member has been recovered over said first tubular member at said overlap of the first tubular member with said jacket of the cable.

4. A terminated electric cable according to claim 3, comprising clamping means secured to said cable around said at least one second tubular member at said overlap of said first tubular member with said jacket of said cable, said clamping means being arranged to mount the cable on a support member.

5. A terminated electric cable according to claim 2, wherein said at least one second tubular member has an outer surface that has sheds thereon.

6. A terminated electric cable according to claim 1, wherein said first tubular member is formed from a recoverable fabric and a weather resistant and non-tracking material that is integral therewith.

7. A terminated electric cable according to claim 6, comprising an arrangement for controlling electrial stress at said terminated end of the cable, said stress control arrangement being enclosed by said first tubular member.

8. A terminated electric cable according to claim 7, comprising a conductive screen that extends longitudinally of the cable between said outer jacket and said dielectric, said conductive screen being exposed beyond said outer jacket at said terminated end of the cable, wherein said stress controlling arrangement comprises at least one tubular member that is recoverable and comprises stress grading material, and that has been recovered so as to overlap the conductive screen and to extend therefrom along said cable dielectric.

9. A terminated electric cable according to claim 1, comprising an arrangement for controlling electrical stress at said terminated end of the cable, said stress control arrangement being enclosed by said first tubular member.

10. A terminated electric cable according to claim 9, comprising a conductive screen that extens longitudinally of the cable between said outer jacket and said dielectric, said conductive screen being exposed beyond said outer jacket at said terminated end of the cable, wherein said stress controlling arrangement comprises at least one tubular member that is recoverable and comprises stress grading material, and that has been recovered so as to overlap the conductive screen and to extend therefrom along said cable dielectric.

11. A terminated electric cable according to claim 1, wherein said recoverable tubular member has been shrunk into position by the application of heat thereto.

* * * * *